(12) United States Patent
Duquesnay et al.

(10) Patent No.: US 6,830,295 B2
(45) Date of Patent: Dec. 14, 2004

(54) FIXING DEVICE FOR FIXING A SEAT TO A VEHICLE FLOOR, AND A SEAT EQUIPPED WITH SUCH A FIXING DEVICE

(75) Inventors: Gilles Duquesnay, Briouze (FR); Gilles Sourdillon, Flers (FR); Farid Senhadji, Flers (FR); Didier Gallienne, Flers (FR)

(73) Assignee: Faurecia Sieges d'automobile S.A., Nanterre (FR)

( * ) Notice: Subject to any disclaimer, the term of this patent is extended or adjusted under 35 U.S.C. 154(b) by 0 days.

(21) Appl. No.: 10/404,568

(22) Filed: Apr. 1, 2003

(65) Prior Publication Data

US 2003/0193228 A1 Oct. 16, 2003

(30) Foreign Application Priority Data

Apr. 11, 2002 (FR) .......................................... 02 04533

(51) Int. Cl.$^7$ ................................................ B60N 2/00
(52) U.S. Cl. ..................... 297/336; 297/331; 296/65.05
(58) Field of Search ............................... 297/331, 335, 297/336; 296/65.03, 65.05, 65.09; 248/503.1

(56) References Cited

U.S. PATENT DOCUMENTS

| 5,248,178 | A | * | 9/1993 | Brambilla ................. 296/65.09 |
| 5,498,051 | A | | 3/1996 | Sponsler et al. |
| 5,743,596 | A | * | 4/1998 | Chabanne ................. 297/463.1 |
| 5,915,779 | A | * | 6/1999 | Duchateau ................. 296/65.16 |
| 5,975,611 | A | * | 11/1999 | Hoshihara et al. ....... 296/65.03 |
| 6,065,804 | A | * | 5/2000 | Tanaka et al. ............... 297/336 |
| 6,234,574 | B1 | | 5/2001 | Hoshihara et al. |
| 6,283,550 | B1 | | 9/2001 | Vialatte et al. |
| 6,354,663 | B1 | * | 3/2002 | Zhang et al. ................ 297/336 |
| 6,485,080 | B2 | * | 11/2002 | Hansen et al. ........... 296/65.03 |
| 6,523,899 | B1 | * | 2/2003 | Tame ......................... 297/331 |

FOREIGN PATENT DOCUMENTS

| EP | 0 500 412 A1 | 8/1992 |
| FR | 2 783 470 A1 | 9/1999 |
| FR | 2 796 344 A1 | 1/2001 |
| WO | WO 00/21778 | 4/2000 |

OTHER PUBLICATIONS

International Search Report; FR 0204533 dated Jan. 30, 2003.

* cited by examiner

*Primary Examiner*—Peter M. Cuomo
*Assistant Examiner*—Joseph Edell
(74) *Attorney, Agent, or Firm*—Marshall, Gerstein & Borun LLP

(57) ABSTRACT

A fixing device for fixing a seat to a vehicle floor, the device comprising firstly a base designed to support a seat proper of the seat, and secondly a rear coupling and a front coupling that are secured to the base. The front coupling comprises an anchoring fork provided with first and second notches designed to co-operate respectively with a rear rod and with a front rod, and first and second hooks mounted on the anchoring fork to move between an unlocked position and a locked position, the first hook being adapted to be in its locked position while holding the rear rod captive, and the seat proper pivoting about the rear rod only, between its tilted-forwards position and its in-use position.

10 Claims, 5 Drawing Sheets

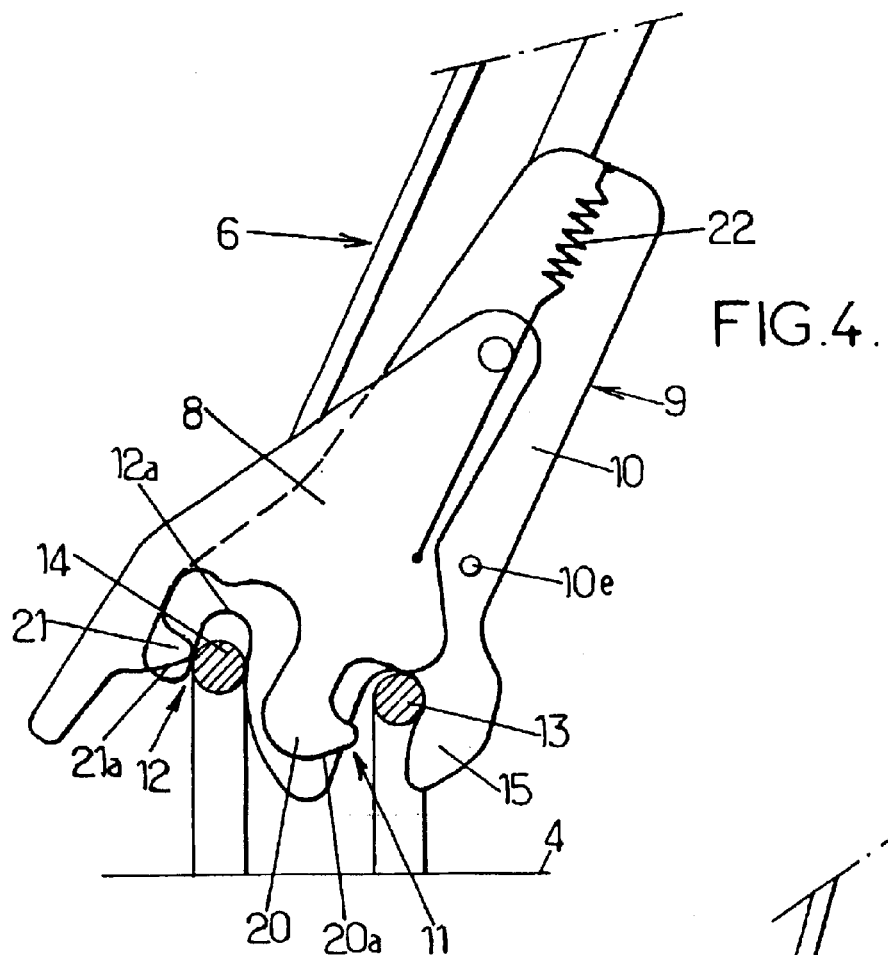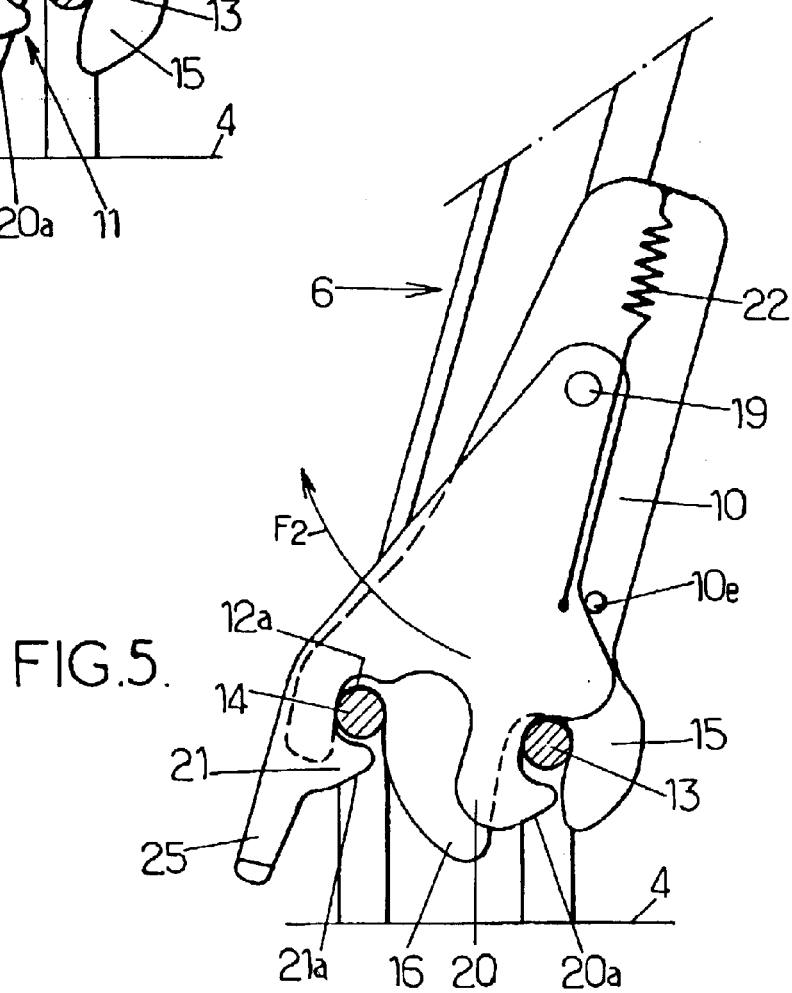

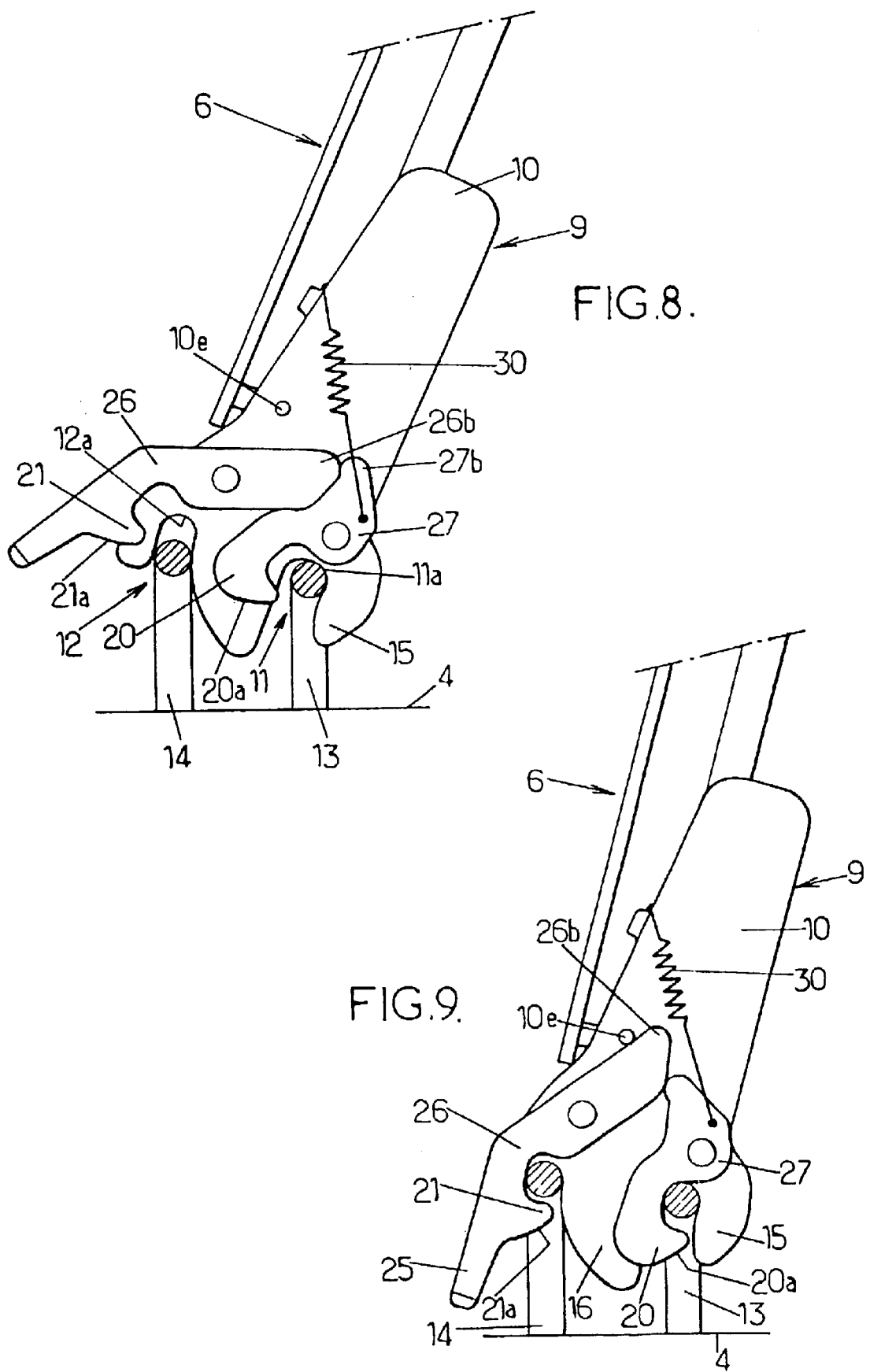

US 6,830,295 B2

FIXING DEVICE FOR FIXING A SEAT TO A VEHICLE FLOOR, AND A SEAT EQUIPPED WITH SUCH A FIXING DEVICE

The present invention relates to fixing devices for fixing a seat to a vehicle floor, and to seats equipped with such fixing devices.

FIELD OF THE INVENTION

More particularly, the invention relates to a fixing device for fixing a seat to a vehicle floor, the seat having a seat proper which extends between a front end and a rear end, and the device comprising firstly a base designed to support the seat proper and which extends horizontally between a front end and a rear end, and secondly a rear coupling and a front coupling that are secured to the base, the front coupling comprising:

an anchoring fork provided firstly with a first notch designed to co-operate with a rear rod secured to the floor when the seat proper is in an in-use position in which the rear coupling co-operates with fixing means on the floor to hold the seat proper substantially horizontal, and secondly with a second notch designed to co-operate with a front rod secured to the floor when the seat proper is in a tilted-forwards position in which the rear coupling no longer co-operates with the fixing means on the floor so as to allow the seat proper to be inclined relative to the horizontal; and first and second hooks mounted on the anchoring fork to move between an unlocked position and a locked position in which said first hook and second hook respectively co-operate with the first notch and the second notch to form first and second closed recesses, the rear rod and the front rod being held captive respectively in the first closed recess and in the second closed recess when the seat is in the tilted-forwards position.

BACKGROUND OF THE INVENTION

Such fixing devices are known, in particular from Patent Application FR 2 783 470. With that type of fixing device, when the seat proper is moved from its in-use position to its tilted-forwards position, the first notch pivots firstly about the rear rod, and then during the movement, the pivot axis is transferred to the front rod so that the second notch pivots about said front rod. While the pivot axis is being transferred, the first notch slides along the rear rod until the first hook holds said rear rod captive substantially at the opening in the first notch. The rear rod thus moves inside the first notch while the seat proper is being moved between its in-use position and its tilted-forwards position. Similarly, when the seat proper is put in place on the floor of the vehicle, the first hook holds the rear rod captive at the opening in the first notch. Therefore, when the seat is brought directly into its in-use position, the rear rod as held captive by the first hook can no longer move along the first notch, which prevents the rear coupling on the base from being placed in register with a fixing member secured to the floor for the purpose of enabling the seat proper of the seat to be fixed to the floor of the vehicle.

It can thus be understood that with that type of fixing device, when the seat proper is brought directly into its in-use position after it is put in place, it is not guaranteed that the seat is locked to the floor of the vehicle, or more exactly, it is not guaranteed that the rear coupling of the base is locked to the floor of the vehicle, which can cause the seat to be tilted accidentally from its in-use position towards its tilted-forwards position.

OBJECTS AND SUMMARY OF THE INVENTION

A particular object of the present invention is to mitigate those drawbacks by providing a fixing device for fixing a seat to a vehicle floor, which device is easy to put in place on the floor, while guaranteeing that the seat proper is properly locked in its in-use position, i.e. relative to the floor of the vehicle.

To this end, in the invention, in a fixing device of the type in question, the first hook is adapted to be in its locked position while holding the rear rod captive in the first closed recess when the seat proper is put in place on the floor of the vehicle, and when the seat proper is in the tilted-forwards position and in the in-use position, and the seat proper pivots about the rear rod only, between its tilted-forwards position and its in-use position.

In preferred embodiments of the invention, any of the following provisions may optionally be used:

the first and second hooks are urged by resilient means into their locked positions, and each of the first and second hooks has a cam surface adapted to come to bear against the rod that is associated with it to cause the corresponding hook to move into its unlocked position while causing the closed recess to open temporarily until the corresponding rod is held captive;

the first notch has an end-wall against which the rear rod bears while the seat proper is pivoting between its tilted-forwards position and its in-use position;

the first and second hooks are formed from a single plate mounted to pivot on the anchoring fork, and the resilient means comprise a spring having a first end fixed to the plate and a second end fixed to the anchoring fork to enable the first and second hooks to be returned resiliently to their locked positions;

the first hook is formed on a first arm mounted to pivot on the anchoring fork about a first pivot and the second hook is formed on a second arm mounted to pivot on the anchoring fork about a second pivot, the resilient means comprise a spring having a first end fixed to the first arm and a second end fixed to the anchoring fork so as to enable the first hook to be returned resiliently to its locked position, and the first and second arms have shapes adapted so that, when the first hook is urged into its locked position by the spring acting on the first arm, the first arm can push the second arm away, thereby bringing the second hook into its locked position;

the second arm is provided with a handle member to enable the second hook to pivot temporarily into its unlocked position, said second arm being adapted to push the first arm away, thereby bringing the first hook into its unlocked position;

the anchoring fork is provided with a guide tip designed to co-operate with the rear rod on the floor, while the seat proper is being put in place on said floor so as to bring the cam surface of the first hook into register with the rear rod;

the first and second notches of the anchoring fork are of oblong shape, are open towards the front of the seat, and extend horizontally-when the seat is in the in-use position; and the base comprises at least one first rail on which the front coupling and the rear coupling are mounted, and a second rail mounted to slide on the first rail, and which is designed to be fixed to the seat proper of the seat to enable the seat proper to move forwards and backwards.

In addition, the invention also provides a vehicle seat having a seat proper which is mounted on the floor of the vehicle by means of at least one fixing device as defined above.

BRIEF DESCRIPTION OF THE DRAWINGS

Other characteristics and advantages of the invention will appear on reading the following description of two of its embodiments, given by way of non-limiting example, with reference to the accompanying drawings.

In the drawings:

FIG. 4 is a view of the front coupling of the device just before it reaches the tilted-forwards position;

FIG. 5 is a view of the front coupling of the first embodiment of the device, with the front coupling being in the tilted-forwards position;

FIG. 8 is a view of the front coupling of the device just before it reaches the tilted-forwards position;

FIG. 9 is a view of the front coupling of the second embodiment of the device, with the front coupling being in the tilted-forwards position.

MORE DETAILED DESCRIPTION

In the various figures, like references designate identical or similar elements.

Figure 1:
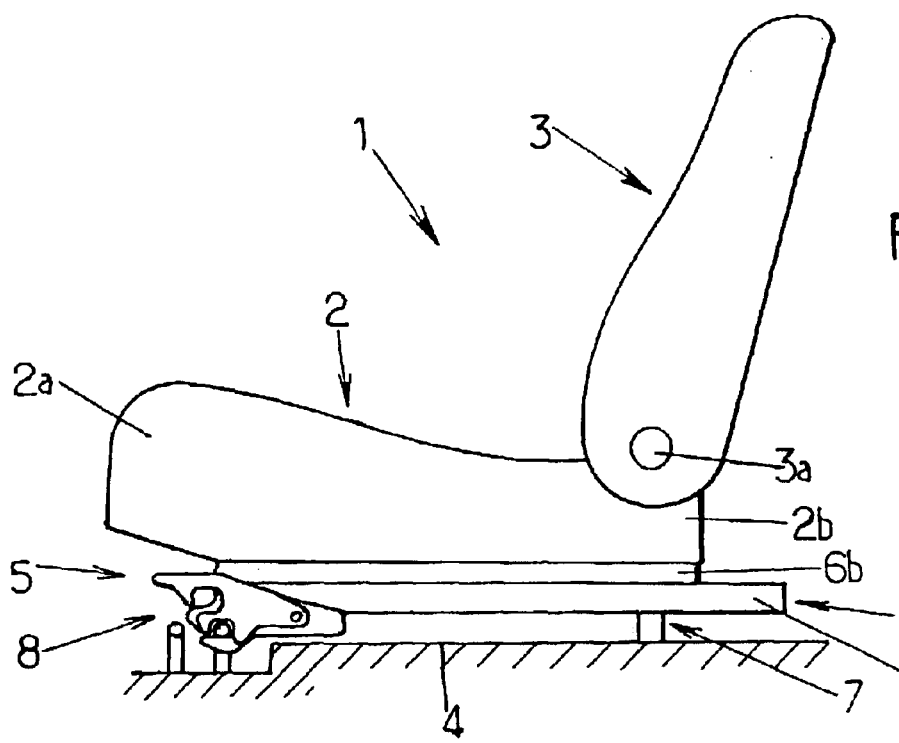
FIG. 1 is a side view of a vehicle seat in the in-use position and provided with a first embodiment of a fixing device of the invention.
Figure 10:
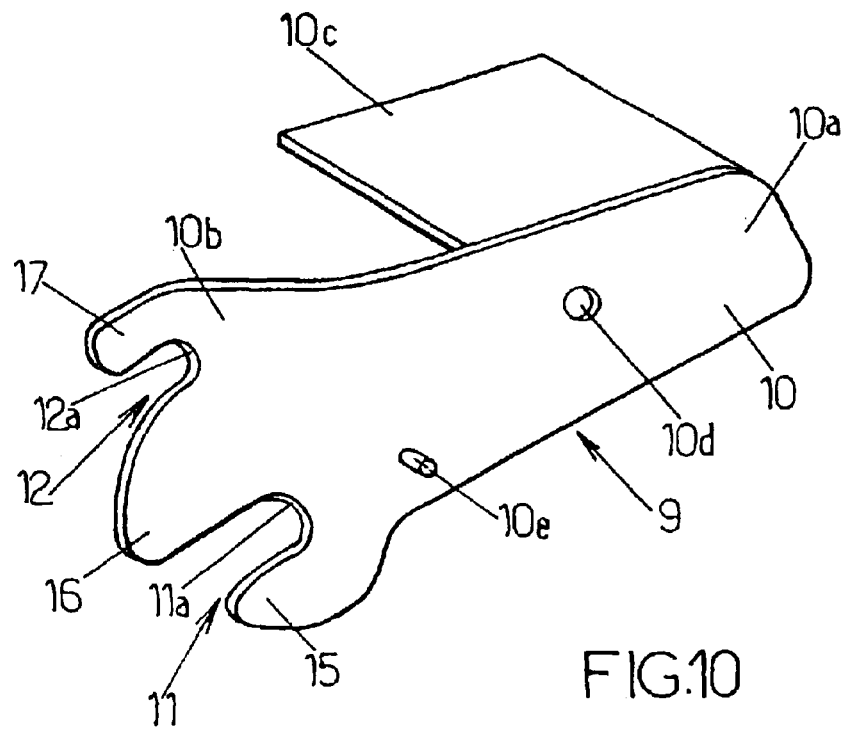
FIG. 10 is a diagrammatic perspective view of the anchoring fork of the front coupling that is designed to be fixed to the base of the fixing device.

In a manner known per se, the motor vehicle seat 1 shown in FIG. 1 comprises a seat proper 2 and a seat back 3.

The seat proper 2 extends between a front end 2a remote from the seat back 3 and a rear end 2b close to the seat back. The seat proper 2 is designed to be fixed to a floor 4 of a motor vehicle by means of a fixing device 5. The fixing device 5 comprises a base 6 designed to support the bottom face of the seat proper 2 and that extends substantially horizontally and longitudinally between a front end and a rear end. The fixing device 5 further comprises at least two rear couplings 7, only one of which is visible in FIG. 1, and two front couplings 8, only one of which is shown in FIG. 1. The rear couplings 7 and the front couplings 8 are secured respectively to the front end and to the rear end of the base 6.

The base 6 may be formed by a runner system comprising a first rail 6a on which the front coupling 8 and the rear coupling 7 are mounted, and a second rail 6b mounted to slide on the first rail 6a. The second rail 6b is designed to be fixed to the seat proper 2 of the seat to enable the seat proper to move forwards or backwards when said seat proper is in a normal in-use position.

When the seat is in the normal in-use position, the rear couplings 7 are locked to the floor 4 of the vehicle by any known means, e.g. by screw means. The rear couplings 7 may also be formed by retractable devices making it possible for the rear of the seat proper 2 to be locked and unlocked rapidly relative to the floor 4 of the vehicle.

In addition, the seat back 3 of the seat is connected to the seat proper 2 by means of a conventional hinge mechanism 3a serving to enable the passenger in said seat to adjust the inclination of the seat back. The hinge mechanism 3a is, in particular, adapted to enable the seat back 3 to be inclined and to be tilted forwards so that it is disposed substantially horizontally and against the top face of the seat proper 2.

As can be seen in more detail in FIGS. 2 to 10, the front coupling 8 of the fixing device comprises an anchoring fork 9 which may be formed from a sheet of metal that is stamped and folded. The anchoring fork 9 has a vertical web 10 that extends substantially longitudinally relative to the direction of the seat and from which a horizontal flap 10c (FIG. 10) extends that is designed to be fixed to the base 6 supporting the seat proper 2. The vertical web 10 of the anchoring fork 9 extends between a rear end 10a and a front end 10b that is provided with a first notch 11 and with a second notch 12 which is disposed above the first notch 11. Each of the notches 11 and 12 is of a substantially oblong U-shape, is open facing forwards, and has an end-wall 11a, 12a.

Figure 2:
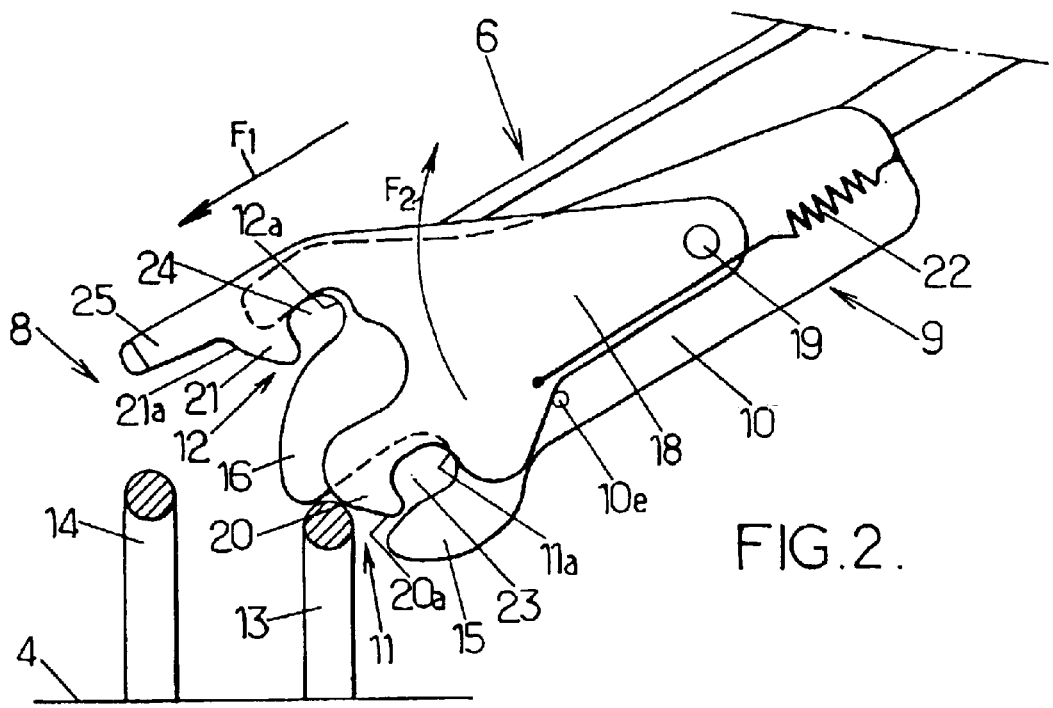
FIG. 2 is a fragmentary enlarged view of the front coupling of the first embodiment of the fixing device, while the seat is being put in place on the floor of the vehicle.

The first notch 11 serves to co-operate with a rear transverse rod 13 mounted in fixed manner on the floor 4 of the vehicle when the seat proper is in an in-use position (FIG. 3), when it is in a tilted-forwards position (FIG. 5), and also while the seat proper is being put in place on the floor of the vehicle (FIG. 2).

The second notch 12 serves to co-operate with a front transverse rod 14 which is also mounted in fixed manner on the floor 4 of the vehicle. The second notch 12 only serves to co-operate with the front rod 14 when the seat proper 2 is in the tilted-forwards position (FIG. 5).

The first notch 11 is defined downwards by a bottom tine 15 and upwards by an intermediate tine 16 which also defines the bottom limit of the notch 12. The notch 12 is defined upwards by a top tine 17.

As can be seen in FIG. 2, the front coupling 8 further comprises a plate 18 mounted to pivot on the vertical web 10 of the anchoring fork 9 by means of a pivot 19. To this end, the vertical web 10 is provided with a through hole 10d for receiving the pivot 19. The plate 18 extends between a rear end and a front end provided with a first hook 20 and with a second hook 21 disposed above the first hook 20.

The plate 18 is mounted to pivot on the anchoring fork 9 while being urged by resilient means such as a spring 22 to cause the plate 18 to bear against an abutment 10e carried by the vertical web of the anchoring fork. The spring 22 has a first end fixed to the vertical web 10 of the anchoring fork, and a second end fixed directly to the plate 18. Thus, the plate 18 is urged resiliently by the spring 22 into a "locked" first position (FIGS. 2 and 3) in which the first and second hooks 20, 21 co-operate with respective ones of the notches 11 and 12 to form first and second closed recesses 23 and 24.

More exactly, the first closed recess 23 is defined by the hook 20, by the end-wall 11a of the notch 11, and by the bottom tine 15 of the anchoring fork 9. The second closed recess 24 is defined by the hook 21, by the end-wall 12a of the notch 12, and by the intermediate tine 16 of the anchoring fork 9. The plate 18 may also take up an unlocked position (FIG. 4) in which the first and second hooks 20 and 21 no longer interfere with the notches 11 and 12, thereby causing the recesses 23 and 24 to be opened.

Each of the hooks 20 and 21 is also provided with a cam surface 20a, 21a adapted to come into contact against the rod that is associated with it, i.e. the front rod 13 or the rear rod 14, in order to cause the corresponding hook 20, 21 to move into its unlocked position so as to cause the closed recess 23, 24 to open temporarily until the corresponding rod is held captive.

Thus, as shown in FIG. 2, when the user wishes to put the seat 1 in place on the floor 4 of the vehicle, said user firstly inclines the seat proper 2 of the seat so that its rear end 2b is at a level higher than the level of its front end 2a. The anchoring fork 9 and the plate 18 are then inclined downwards, as shown in FIG. 2. The user then presents the seat at an angle of about 30° relative to the floor 4, and then causes the seat to move in translation in the direction indicated by arrow F1 so as to cause the cam surface 20a of the hook 20 to co-operate with rear rod 13 on the floor 4 of the vehicle. The cam surface 20a then comes to bear against the rear rod 13, thereby causing the plate 18 to pivot about the pivot 19 in the direction indicated by arrow F2, against the drive exerted by the spring 22, thereby causing the recess 23 to open temporarily. When the hook 20 ceases to interfere with the rear rod 13, the return spring 22 then causes the hook 20 to snap shut, thereby holding the rear rod 13 captive inside the closed recess 23.

The anchoring fork 9, or more precisely the intermediate tine 16 of the vertical web 10 may also form a guide tip designed to co-operate with the rear rod 13 to bring the cam surface 20a of the hook 20 into register with said rear rod. Similarly, the intermediate tine 16 forming the guide tip, and the bottom tine 15 of the anchoring fork may form a setback inside which the cam surface 20a of the hook 20 is situated so as to enable the cam surface 20a of the hook 20 to be guided against the rear rod 13, thereby causing the hook 20 to retract into its unlocked position.

Figure 3:
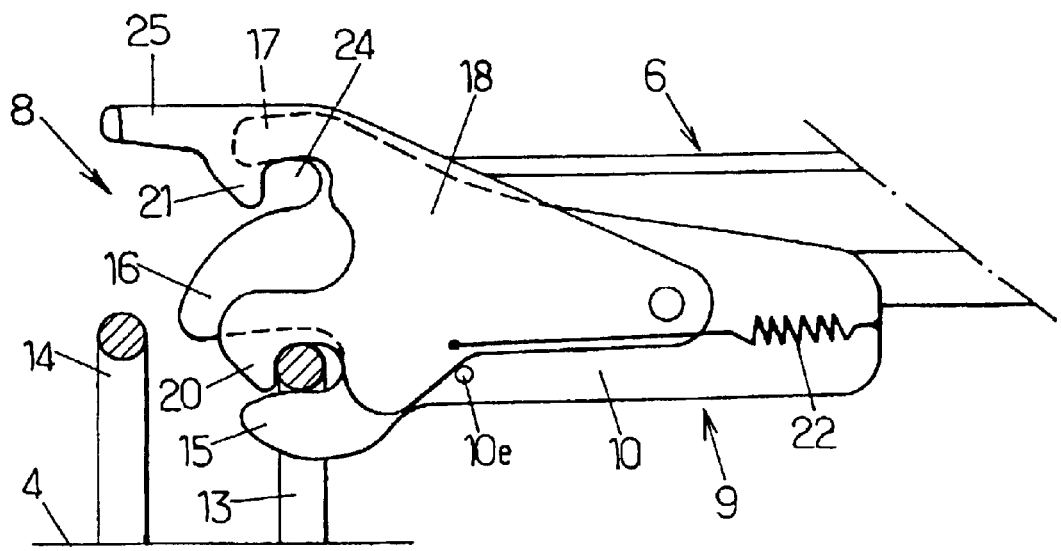
FIG. 3 is a view similar to FIG. 2, with the front coupling of the device being in the in-use position.

The user can then tilt the seat 1 back into its in-use position, shown in FIGS. 1 and 3, by pivoting it about the rear rod 13. In the in-use position, the rear couplings 7 co-operate with suitable fixing means on the floor 4 of the vehicle to hold the seat proper 2 substantially horizontal.

As can be seen in FIGS. 2 and 3, while the seat 1 is being tilted back from its inclined position towards its in-use position, the rear rod 13 does not slide inside the notch 11, thereby making it possible for the rear couplings 7 to be brought reliably into register with their complementary fixing means provided on the floor 4 of the vehicle.

When a user wishes to tilt the seat forwards, said user firstly actuates the hinge mechanism 3a (FIG. 1) in order to fold down the seat back 3 until it is horizontal and against the top face of the seat proper 2. Then, the user unlocks the two rear couplings 7 of the fixing device 5 in order to enable the seat proper 2 to be tilted forwards.

When the seat proper 2 is tilted forwards, the anchoring fork 9 or more exactly the notch 11 pivots about the rear rod 13, while the hook 20 remains in its locked position. When the hook 21 comes into register with the front rod 14, the cam surface 21a of the hook 21 then bears against the front rod 14. The cam surface 21a coming to bear against front rod 14 then causes the hooks 21 and 20 to be unlocked so that the front rod 14 engages in the notch 12 until it comes into abutment against the end-wall 12a of said notch 12 (FIG. 4).

When the front rod 14 ceases to co-operate with the cam surface 21a, the spring 22 then returns the plate 18 automatically into abutment against the abutment member 10e so that the hooks 20 and 21 respectively hold the rear rod 13 and the front rod 14 captive (FIG. 5). Holding the rear rod 13 and the front rod 14 captive in the closed recesses 23 and 24 formed by the hooks 20 and 21 and by the notches 11 and 12 makes it possible to retain the seat proper 2 against any forward and backward drive.

As can be seen in FIGS. 2 to 5, the plate 18 may also be provided with a handle member 25 which, in the example in question, is situated substantially in alignment with the second hook 21. The handle member 25 makes it possible for a user to pivot the plate 18 temporarily in the direction indicated by arrow F2 to put the first and second hooks 20 and 21 in the unlocked position in order to release the front and rear rods from the anchoring fork so as to enable the seat 1 to be extracted from the floor 4 of the vehicle.

In a second embodiment of the invention shown in FIGS. 6 to 9, the first hook 20 is formed on a first arm 27 and the second hook 21 is formed on a second arm 26 that is distinct from the first arm 27. The first arm 27 is mounted to pivot on the vertical web 10 of the anchoring fork 9 by means of a pivot 29, and the second arm 26 is mounted to pivot on the vertical web 10 of the anchoring fork 9 by means of a second pivot 28. The anchoring fork 9 of the second embodiment is also provided with a first notch 11 and with a second notch 12, and the vertical web 10 of the anchoring fork is of the same shape as the vertical web of the anchoring fork of the first embodiment (FIG. 10), except that it has two through holes for receiving the pivots 28 and 29.

In this embodiment, the resilient return means comprise a spring 30 having a first end fixed to the first arm 27 carrying the hook 20 and a second end fixed to the anchoring fork 9 and more exactly to the vertical web 10.

The second arm 26 has a first end 26a on which the second hook 21 is formed and a second end 26b, the pivot 28 of the arm 26 being situated between the two ends 26a and 26b of the arm 26.

The first arm 27 also has a first end 27a on which the first hook 20 is formed and a second end 27b designed to co-operate with the end 26b of the second arm 26. The pivot 29 is disposed between the two ends 27a and 27b of the first arm 27.

Figure 6:
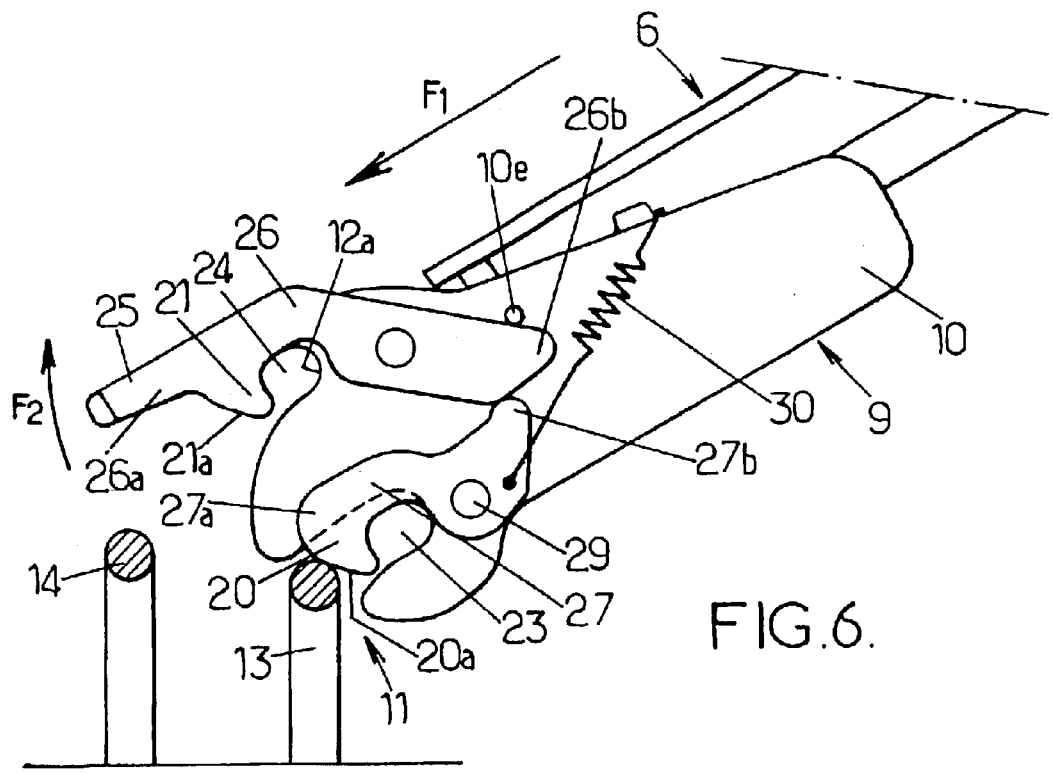
FIG. 6 is a fragmentary enlarged view of the front coupling of the second embodiment of the fixing device, while the seat is being put in place on the floor of the vehicle.
Figure 7:
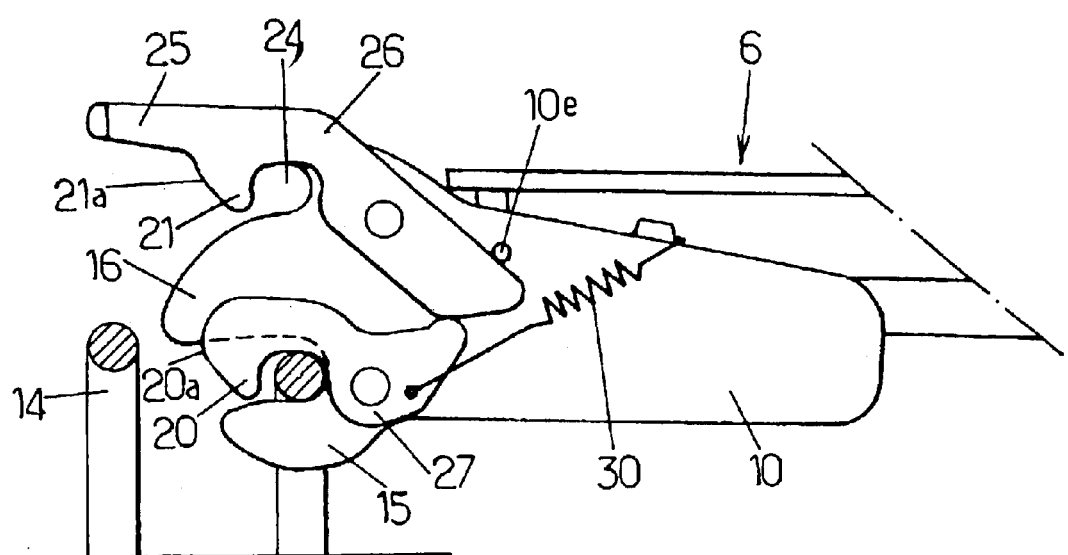
FIG. 7 is a view similar to FIG. 6, the front coupling of the device being in the in-use position.

The purpose of the return spring 30 is to return the first hook 20 to its locked position automatically as shown in FIGS. 6, 7, and 9, the end 27b of the arm 27 then serving to bear against and push away the end 26b of the arm 26 so that the hook 21 is also pushed away into its locked position. The anchoring fork 9 also has an abutment member 10e against which the end 26b of the arm 26 is designed to come into abutting contact when the hook 21 is in the locked position.

Thus, as can be seen in FIG. 6, when the seat proper 2 of the seat of the vehicle is put in place on the rear anchoring rod 13, it is necessary merely to incline the seat proper 2 and then to cause the seat proper 2 to move in translation in the direction indicated by arrow F1 in order to enable the cam surface 20a of the first hook 20 to co-operate with the anchoring rod 13 so as to push away the hook 20 and thus the arm 27 into an unlocked position such that the closed recess 23 opens to enable the rear rod 13 to be inserted to the end-wall 11a of the first notch 11.

When the rear rod 13 is put into contact with the end-wall 11a of the notch 11, said rear rod 13 ceases to co-operate with the hook 20, which makes it possible for the return spring 30 to return said hook 20 into its locked position in order to enable the rear rod 13 to be held captive in the closed recess 23.

The user can then place the seat proper 2 of the vehicle in the in-use position as shown in FIG. 7, or can then place the seat proper 2 in the tilted-forwards position as shown in FIG. 9.

When the user wishes to place the seat proper 2 in the tilted-forwards position, it is then necessary merely to cause the seat proper 2 to pivot forwards so that the cam surface 21a of the hook 21 co-operates with the front anchoring rod 14 so as to push the hook 21 away into its unlocked position, as shown in FIG. 8.

When the hook 21 and thus the arm 26 are put in the locked position, the end 26b of the arm 26 pushes the end 27b of the arm 27 away so that the arm 27 and thus the hook 20 are also in the locked position. In which case, as can be seen in FIG. 8, the hook 20 no longer holds the rear anchoring rod 13 captive, which rod is then merely in abutment against the end wall 11a of the notch 11 so as to enable the seat proper to be pivoted into the tilted-forwards position until the rear rod 14 is substantially in contact with the end-wall 12a of the notch in the anchoring fork 9.

When the hook 21 ceases to co-operate with the front rod 14, the spring 30 then returns the arm 27 automatically into its locked position so that the hook 20 holds the rear rod 13 captive. While the arm 27 is pivoting counterclockwise, the end 27b of the arm 27 also pushes the end 26b of the arm 26 away counterclockwise until said end 26b comes into abutting contact against the abutment member 10e of the anchoring fork.

During this movement, the hook 21 is then moved clockwise so that said hook comes to hold the anchoring rod 14 captive in the closed recess 24 formed by said hook 21 and by the notch 11 in the anchoring fork 9, as can be seen in FIG. 9. In this position, the seat proper 2 can then no longer be moved either forwards or backwards.

In this embodiment, the anchoring fork 9, or more exactly the intermediate tine 16 of the vertical web 10 of the anchoring fork also forms a guide tip designed to co-operate with the rear rod 13 (see FIG. 6) so that, when the seat proper 2 is put in place on the floor of the vehicle, the guide tip 16 makes it possible to bring the cam surface 20a of the first hook into register with the rear rod 13.

The second arm 26 may also be provided with a handle member 25 situated substantially in alignment with the second hook 20. Thus, when the user actuates said handle member 25, said user causes the arm 26 to pivot, said pivoting being transmitted to the arm 27 by means of the end 26b of the arm, thereby causing the hooks 20 and 21 to move into their unlocked positions to enable the seat 1 to be extracted from the floor 4 of the vehicle.

What is claimed is:

1. A fixing device for fixing a seat to a vehicle floor, the seat having a seat proper which extends between a front end and a rear end, and the device comprising firstly a base designed to support the seat proper and which extends horizontally between a front end and a rear end, and secondly a rear coupling and a front coupling that are secured to the base, the front coupling comprising:

an anchoring fork provided firstly with a first notch designed to co-operate with a rear rod secured to the floor when the seat proper is in an in-use position in which the rear coupling co-operates with fixing means on the floor to hold the seat proper substantially horizontal, and secondly with a second notch designed to co-operate with a front rod secured to the floor when the seat proper is in a tilted-forwards position in which the rear coupling no longer co-operates with the fixing means on the floor so as to allow the seat proper to be inclined relative to the horizontal; and first and second hooks mounted on the anchoring fork to move between an unlocked position and a locked position in which said first hook and said second hook respectively co-operate with the first notch and the second notch to form first and second closed recesses, the rear rod and the front rod being held captive respectively in the first closed recess and in the second closed recess when the seat is in the tilted-forwards position;

wherein the first hook is adapted to be in the locked position while holding the rear rod captive in the first closed recess when the seat proper is put in place on the floor of the vehicle, and when the seat proper is in the tilted-forwards position and in the in-use position, and wherein the seat proper pivots about the rear rod only when moved between the tilted-forwards position and the in-use position.

2. A device according to claim 1, in which the first and second hooks are urged by resilient means into the locked positions, and each of the first and second hooks has a cam surface adapted to come to bear against the rod that is associated with it to cause the corresponding hook to move into the unlocked position while causing the closed recess to open temporarily until the corresponding rod is held captive.

3. A device according to claim 2, in which the first notch has an end-wall against which the rear rod bears while the seat proper is pivoting between the tilted-forwards position and the in-use position.

4. A device according to claim 3, in which the first and second hooks are formed from a single plate mounted to pivot on the anchoring fork, and the resilient means comprise a spring having a first end fixed to the plate and a second end fixed to the anchoring fork to enable the first and second hooks to be returned resiliently to their locked positions.

5. A device according to claim 3, in which the first hook is formed on a first arm mounted to pivot on the anchoring fork about a first pivot and the second hook is formed on a second arm mounted to pivot on the anchoring fork about a second pivot, the resilient means comprising a spring having a first end fixed to the first arm and a second end fixed to the anchoring fork so as to enable the first hook to be returned resiliently to the locked position, and the first and second arms have shapes adapted so that, when the first hook is urged into the locked position by the spring acting on the first arm, the first arm can push the second arm away, thereby bringing the second hook into the locked position.

6. A device according to claim 5, in which the second arm is provided with a handle member to enable the second hook to pivot temporarily into the unlocked position, said second arm being adapted to push the first arm away, thereby bringing the first hook into the unlocked position.

7. A device according to claim 2, in which the anchoring fork is provided with a guide tip designed to co-operate with the rear rod on the floor, while the seat proper is being put in place on said floor so as to bring the cam surface of the first hook into register with the rear rod.

8. A device according to claim 1, in which the first and second notches of the anchoring fork are of oblong shape, are open towards the front of the seat, and extend horizontally when the seat is in the in-use position.

9. A device according to claim 1, in which the base comprises at least one first rail on which the front coupling and the rear coupling are mounted, and a second rail mounted to slide on the first rail, and which is designed to be fixed to the seat proper of the seat to enable the seat proper to move forwards and backwards.

10. A vehicle seat having a seat proper which is mounted on the floor of the vehicle by means of at least one fixing device according to claim 1.

* * * * *